(12) United States Patent
Horvat et al.

(10) Patent No.: US 7,681,593 B1
(45) Date of Patent: Mar. 23, 2010

(54) SEQUENTIAL DISTRIBUTOR OF GASES AND LIQUIDS

(76) Inventors: Branimir L. Horvat, 3307 Clark Rd., Sarasota, FL (US) 34242; Nevenka Horvat, 3307 Clark Rd., Sarasota, FL (US) 34242

( * ) Notice: Subject to any disclaimer, the term of this patent is extended or adjusted under 35 U.S.C. 154(b) by 954 days.

(21) Appl. No.: 11/450,177

(22) Filed: Jun. 12, 2006

Related U.S. Application Data

(63) Continuation-in-part of application No. 10/928,436, filed on Dec. 13, 2004.

(51) Int. Cl.
*F16K 11/065* (2006.01)
(52) U.S. Cl. .............................. 137/625.11; 137/625.12
(58) Field of Classification Search .................................
137/625.11–625.13
See application file for complete search history.

(56) References Cited

U.S. PATENT DOCUMENTS

| 5,261,451 | A  | * | 11/1993 | Spencer | .................. | 137/625.11 |
| 6,499,506 | B2 | * | 12/2002 | Feiner | .................... | 137/625.11 |
| 7,267,404 | B2 | * |  9/2007 | Kern et al. | .............. | 137/625.11 |

* cited by examiner

*Primary Examiner*—Kevin L Lee
(74) *Attorney, Agent, or Firm*—Frank A. Lukasik

(57) ABSTRACT

A sequential distributor of gases/liquids for sequential, discrete, distributions of gases/liquids in specific time intervals to the most distal parts of an extremity to the most proximal part of an extremity comprising an outer cylinder having a plurality of rows of openings formed through the cylinder, an inner distributing cylinder slidably mounted within the outer distributing cylinder, a motor driving the inner cylinder, a transfer block having a pressure sensor attached to the inner cylinder, and a plurality of output hoses connected to the openings in the outer cylinder. The distributor is supplied with air by an external pump and the cycling of the gases/liquids are controlled by a computer.

3 Claims, 13 Drawing Sheets

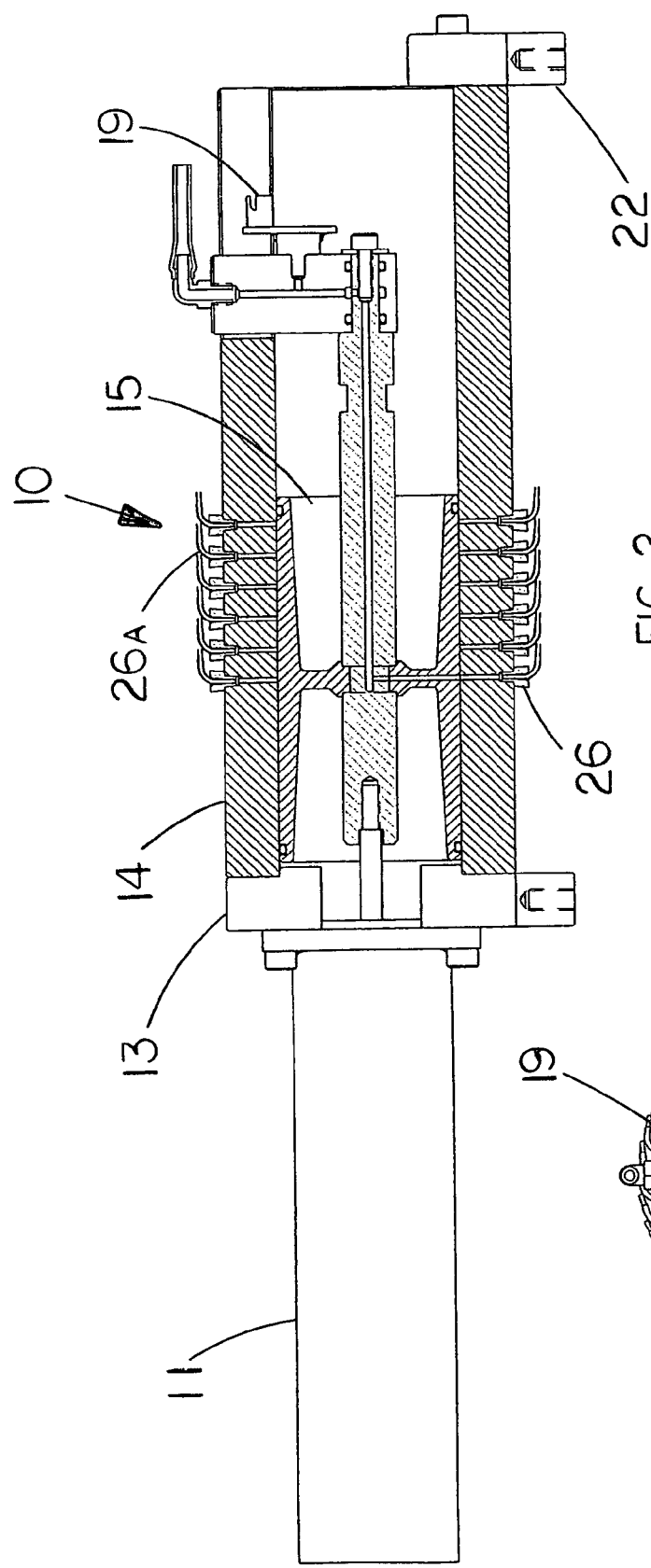
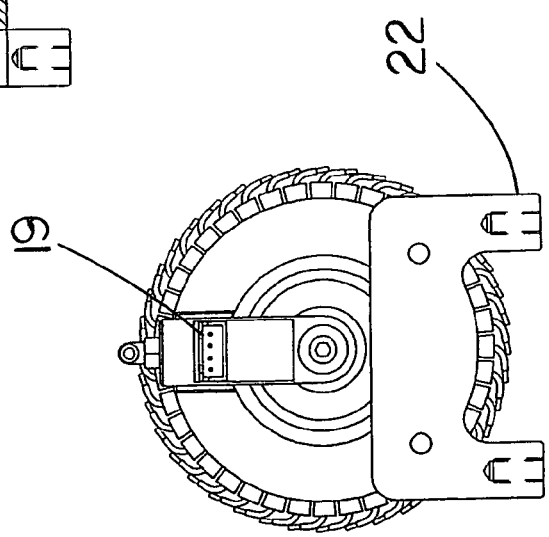
FIG. 2
FIG. 2A

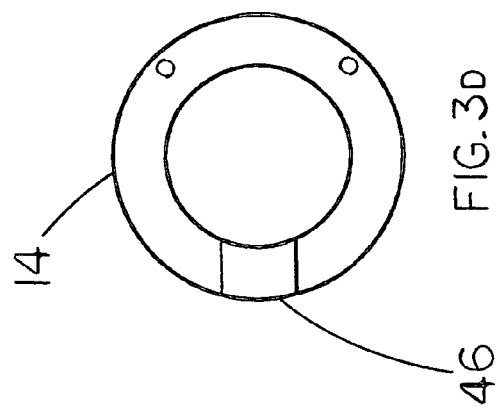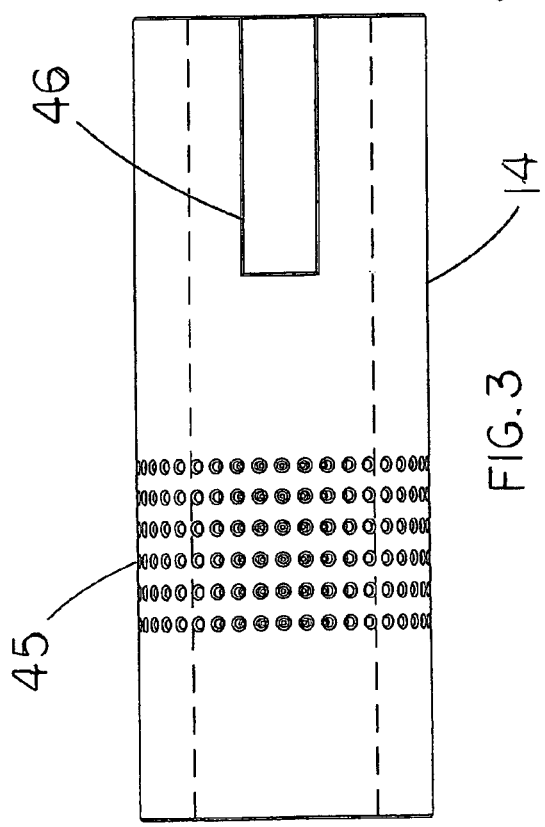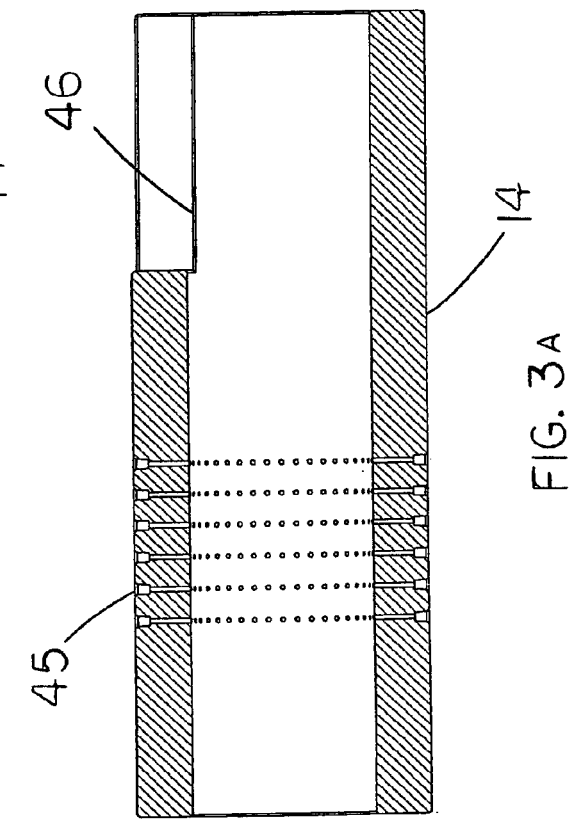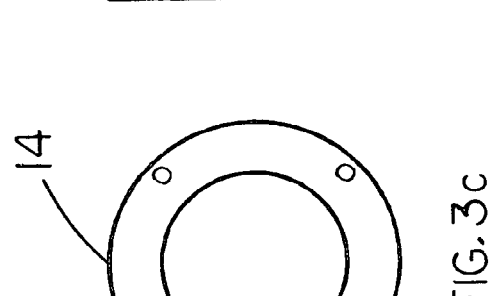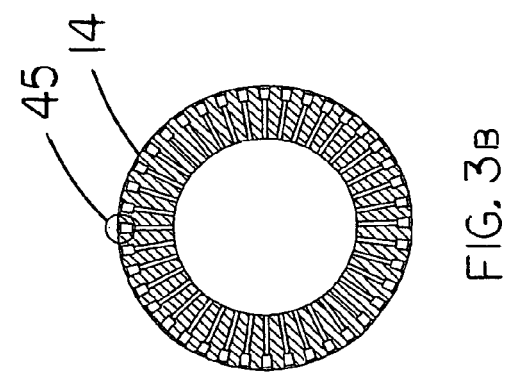

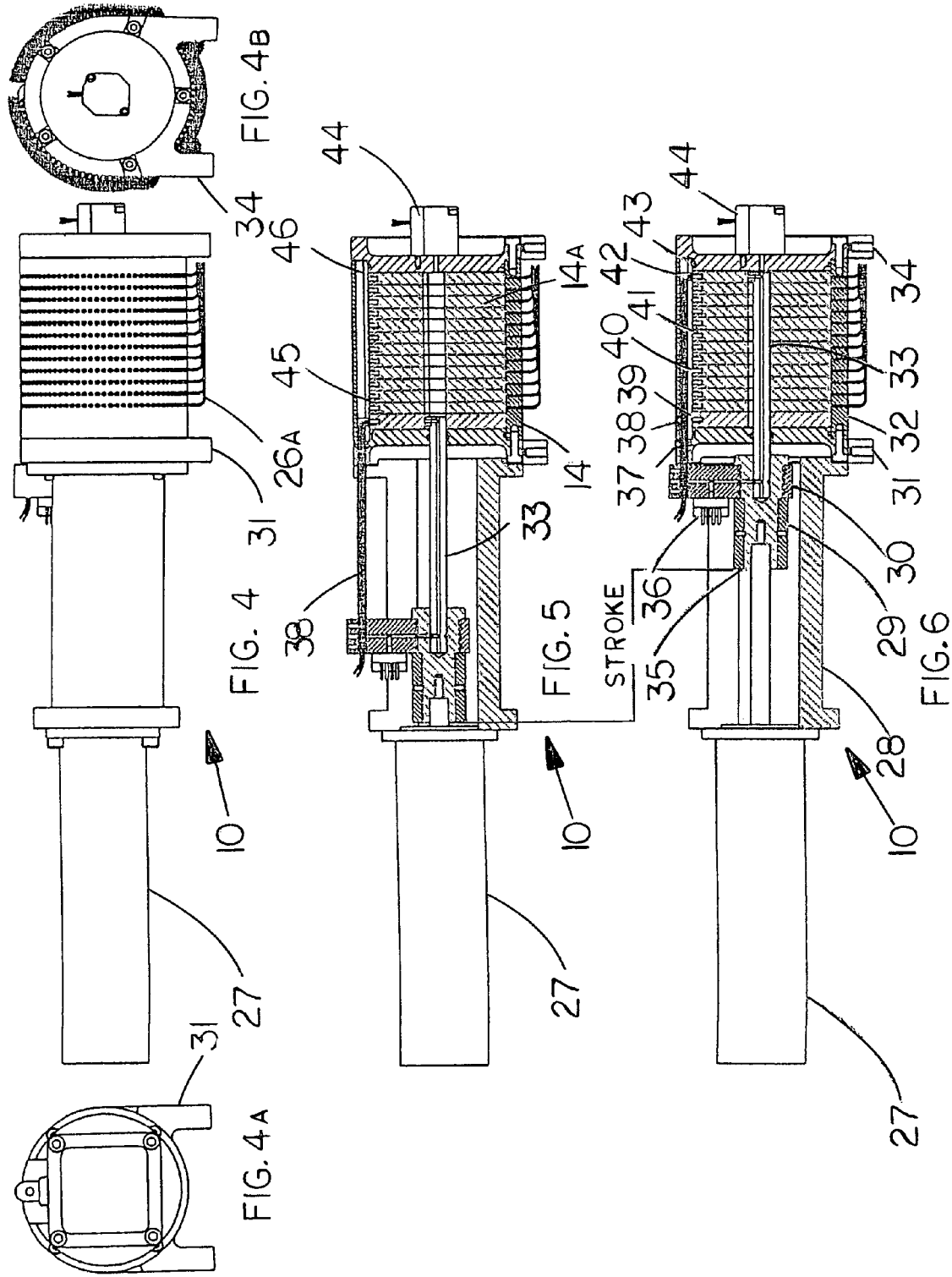

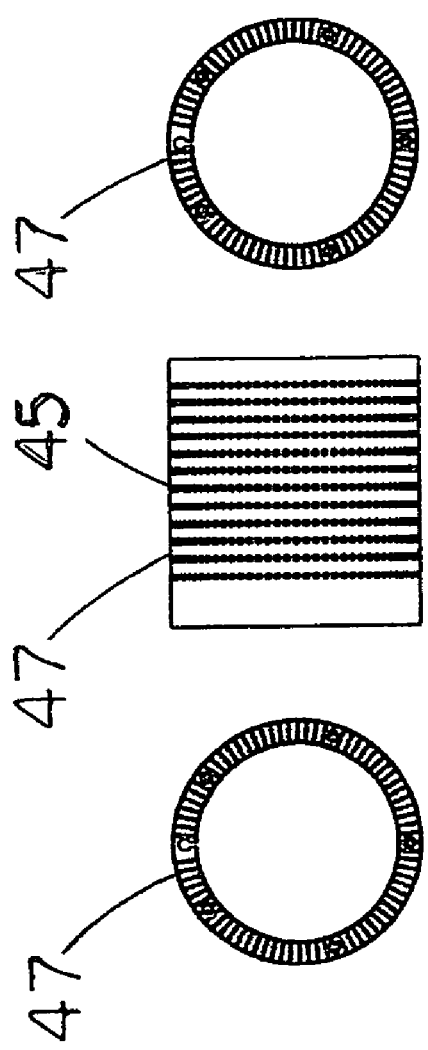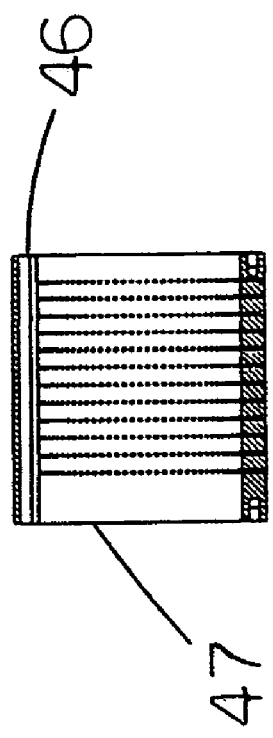

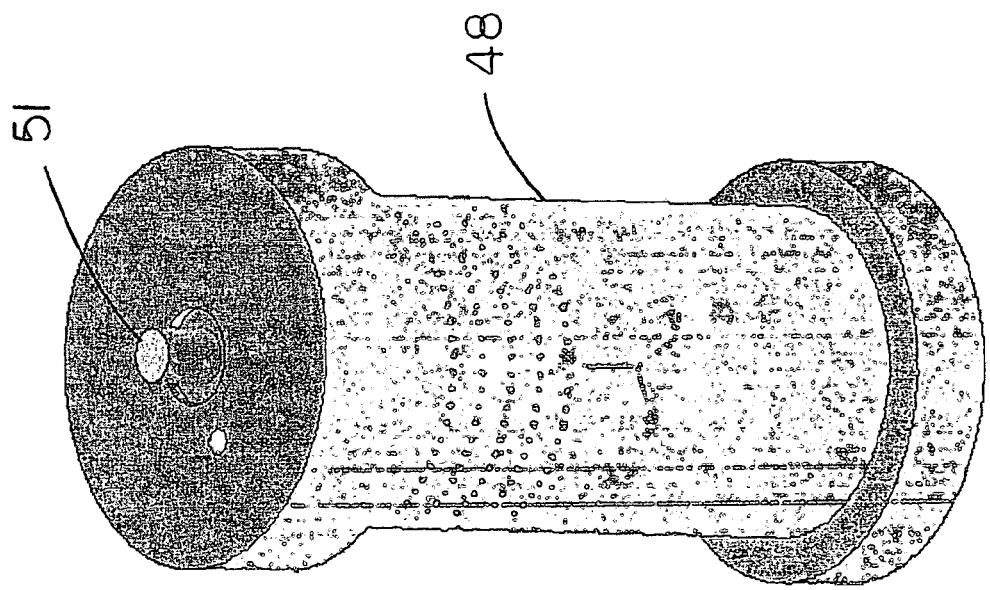

SEQUENTIAL DISTRIBUTOR OF GASES AND LIQUIDS

RELATED INVENTION

This is a Continuation-In-Part of application Ser. No. 10/928,436, Filed Dec. 13, 2004 for SEQUENTIAL LYMPHEDEMA PUMP.

BACKGROUND OF THE INVENTION

This invention is generally related to devices for the treatment of lymphedema and more particularly to a positive pressure pump which will serve the users needing numerous sequential, discrete, distributions of gases or liquids in specific time intervals. This invention is related to devices used in medicine (e.g. durable medical equipment like Sequential Lymphedema Pump), medical and general chemical laboratories requiring numerous sequential, discrete, distributions of gases and liquids in specific time intervals.

SUMMARY OF THE INVENTION

The present invention, a Sequential Distributor of Gases and Liquids (SDGL) is a positive pressure pump for extraction of fluid (lymph) from the extremities which functions on the principle of sequential pumping of discrete individual pressure chambers from the most distal parts of the extremity to the most proximal part of the extremity. The SDGL is regulated by a computer which monitors the pressure of each chamber and corrects the pressure when it lowers. Instead of numerous separate valves used for that purpose, a choice of four apparatuses are given and are designed to serve the needs to distribute the gas or liquids to a single, or numerous points. These distributors may be designed to distribute successively the substrate to one after another area or to more than one point at the same time. They may be used in laboratory situations, medical and pharmaceutical use or general industrial conditions. The operation will be controlled through a computer programmed to do exactly the functions users require.

The SDGL has the following general features:

a. Simple operational procedures.

b. Maintenance and servicing of the equipment will be minimal due to a small number of parts.

c. Capable of being constructed for distributions of minute amounts or large quantities of gases or liquids.

d. Capability of delivering gases or liquids to single areas or numerous distinct areas sequentially.

e. Accurate pressure sensitive delivery—When taken into account impedance of the channels for delivery of air and liquids, temperature and viscosity of the substrate to be delivered, very accurate amounts of substrate can be programmed for delivery.

There are several choices of the modifications of the models of the distributors as described below.

BRIEF DESCRIPTION OF THE DRAWINGS

FIG. 2. A longitudinal section through a divider with a single inner cylinder in the maximal extension of the inner cylinder.

FIGS. 3, 3a, 3b, 3c, and 3d are illustrations of a single cylinder embodiment showing a side view, a sectional view and end views of the outer distributing cylinder.

FIGS. 4, 4a, and 4b are illustrations of the overall appearance of a multi-ring inner cylinder model.

FIG. 5 is a cross sectional drawing showing the first ring operational.

FIG. 6 is an illustration of the axle at the terminal ring of the inner cylinder.

FIGS. 7, 7a, 7b, and 7c are illustrations of a cross section, and opposite ends of the outside distributing cylinder in accordance with the invention.

FIG. 8 is an illustration of a single inner cylinder model with groove/ridge and indentations in accordance with the invention.

DETAILED DESCRIPTION OF THE INVENTION

The instant invention, a Sequential Distributor for gases and Liquids (SDGL) will serve the users needing numerous sequential, discrete, distributions of gases or liquids in specific time intervals. Instead of numerous separate valves used for that purpose, a choice of several apparatuses are given and are designed to serve these needs to distribute the gas or liquids to a single point. These distributors may be designed to distribute successively the substrate to one after another area or to more than one point at the same time. They may be used in the laboratory situations, medical and pharmaceutical uses or general industrial conditions. The operation will be controlled through a computer programs to do exactly the functions users require.

When two or more SDGLs are used for the laboratory or industrial purposes, different gases and or liquids may be delivered at different times to similar places necessary for discrete testing of various substrates or in the production of composites in the industry. All of these SDGLs may, and probably will, be managed, in their operations by a single computer.

The proposed SDGL will have the following features:

a. Single operational procedures.

b. Maintenance and servicing of the equipment will be minimal due to a small number of moving parts.

c. Capable of being constructed for distribution of minute amounts or large quantities of gases or liquids.

d. Capable of delivering gases or liquids to single areas or numerous distinct areas sequentially.

e. Accurate pressure sensitive delivery. When taken into account impedance of the channels for delivery of air or liquids, temperature and viscosity of the substrate to be delivered, very accurate amounts can be programmed for delivery.

There are several embodiments of the modifications of the models of the distributors as described below.

Figure 1:
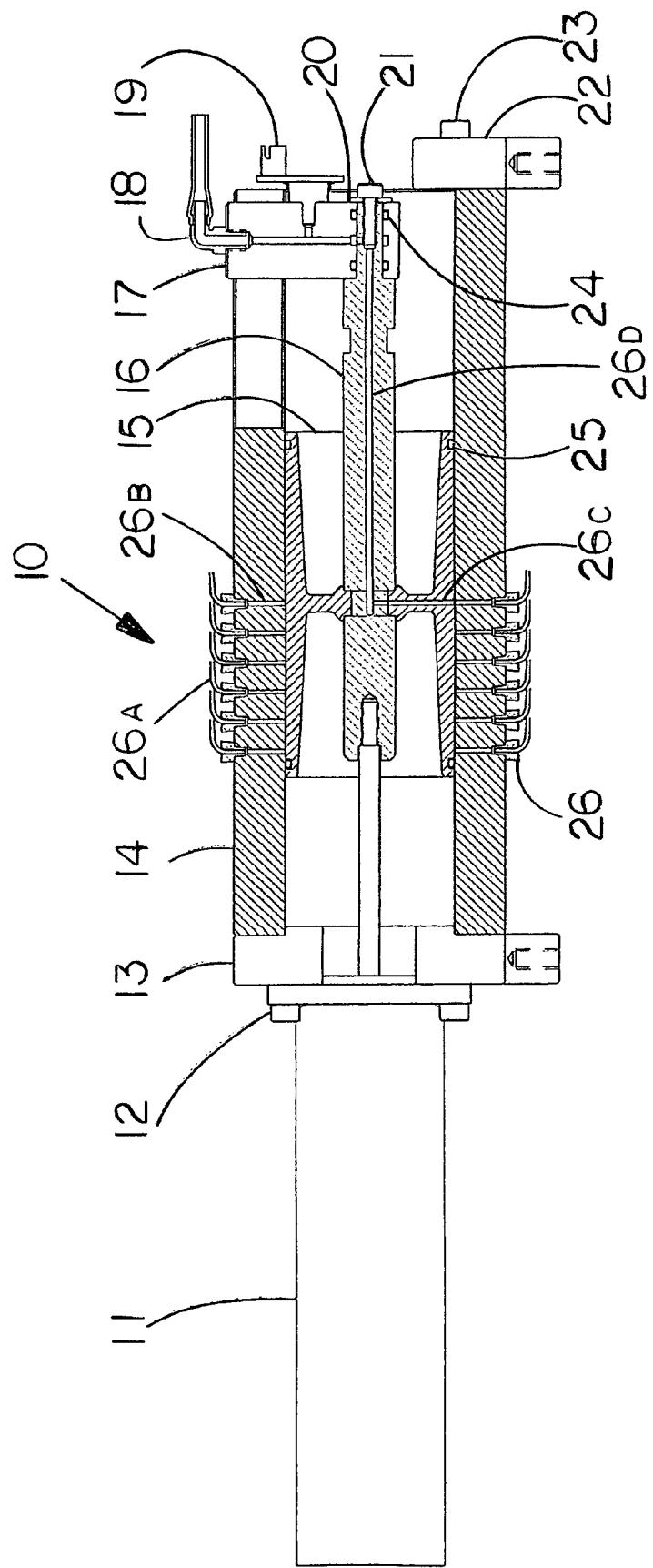
FIG. 1. A longitudinal section through a divider with a single inner cylinder in the initial position of the inner cylinder.

A first embodiment is shown in FIGS. 1-3 showing the construction of the inner cylinder 15 having one or more openings 26c to correspond with the openings 26b on the outer distributing cylinder 14 (depending on how many different areas are to be served with the distributor 10). The distance between the successive holes 26c on the inner cylinder 15 must be projected to prevent two successive holes 26c get in contact with the different holes 26b on the outside distributing cylinder 14 and inappropriate "feeding" of the air/liquid is done. In all choices which will be discussed below, the gas or liquid will be delivered through the axle 16 for moving the inner distributing cylinder 15 and then entering in to the cylinder 15.

The holes 26c on the inner cylinder 15 may be done in a horizontal fashion when several places have to be supplied with the air or liquids or in a serpentine way when only one area at a time has to be served.

The Sequential distributor 10, of gases and liquids of the invention, is shown in longitudinal section in FIG. 1 wherein the principle parts are the actuator 11, the outer distributing cylinder 14, and the piston 15. FIGS. 1-3 are illustrations of a longitudinal section through a single cylinder model with FIG. 1 showing a single inner cylinder 14, piston 15 in an extended position, drive end cap 13, mounting block 22 is fastened to outer distributing cylinder 14 with screws 23.

Actuator 11 is fastened to the end cap 13 with screws 12. Drive shaft 16 is connected to the actuator 11 through piston 15. Transfer block 17 is affixed to the drive shaft 16 with mounting screw 21 and flat washer 20. A barbed elbow 18 is connected through transfer block 17 and "O" rings 24 are mounted on drive shaft 16. A pressure sensor 19 is mounted on transfer block 17. "O" rings 25 are mounted on piston 15. Push fittings 26 are used to connect output hoses 26a to the cylinder 14.

FIG. 2 shows the piston 15 in a retracted position. FIG. 2a is an end view showing the pressure switch 19 mounted on transfer block 17. FIGS. 3-3d show various views of cylinder 14 having a plurality of recessed openings 45 around the circumference of cylinder 14 and in particular a slot 46 formed in a first end. Also shown are coupler 35, valve end cap 34, drive pin 33, cylinder 32, and drive end cap 31. Pressure sensor 36 is mounted on arm 30. "O" rings 37 and 43 are mounted on opposite ends of cylinder 32. "O" rings 37 may be used for each ring of the inner cylinder 15. Two dividers, 8 mm divider 39 and 6 mm divider 41 are provided.

FIGS. 4-6 show a second embodiment of the inner cylinder 14 is by a set of rings 14a instead of a single cylinder. The delivery of the air is similar to the one described in the first embodiment. When one area has to be supplied with the air or liquids, there may be several horizontally positioned holes for distribution of air or liquids on each or some of these rings 14a. They will correspond to several sets of positions on the outer distributing cylinder 14. The entrances of the delivery point will be in a horizontal row of entrances (when one or more that one area is to be supplied with the air or liquids) and the rotation of the inner cylinder 15 will be successively reaching the next point of the entrances on the outer distributing cylinder 14 in each next move of the inner distributing cylinder 14.

This construction will be used when several distinct deliveries of air or gases have to be done at the same time to different areas. In addition to the number of points necessary to be served, the maximum necessary diameter of the distributor 10 will determine the applicability of this construction.

Each ring 14a will have two O-rings 37 to protect the integrity of the inter-cylindrical space from outside interferences.

Each of the rings 14a will be moved individually as the rest of the rings are in a locked position. The ring 14a will rotate from one to the next opening in succession while the rest of the rings 14a are in a locked position. After the first ring 14a completes its rotation, this ring will be locked in the starting position. In this position, this ring will not engage any channel on the outer distributing cylinder 14. At this point, the next ring 14a is possible to be engaged to start rotation with the position where there is no distribution of air or liquid. Then it will be turned to the first position for distribution, etc. This ring will be again possible to move when all of the rest of the remaining rings 14a finish their revolution and are in their initial locked position. However, if the function requires that this ring is again distributing the air or liquid, the rest of the rings will be first locked in the "O" position and this ring may start to function again.

Thus, the initial position of any ring will not be connected with any actual position for distribution of the outer distributing cylinder 14. Thus, each ring will be possible to start rotation when the previous ring finishes its rotation and reaches the initial position again. This construction will allow more individual positions of delivery of gases or liquids to be placed on a cylinder of a relatively limited diameter.

In all of the above choices of construction, the inner cylinder 15 will be tightly fitted by the outer cylinder 14 and to the pump (not shown). Each individual channel of the inner cylinder 15 or a ring 14a (when constructed as series of individual rings) will specifically reach appropriate corresponding area on the outside distributing cylinder 14 (or group of channels on the outer cylinder 14) separately from all any other channels.

As stated before, the inner cylinder 15 will be firmly attached to the pump and the pump will deliver the gases or liquids to the central part of the inner cylinder 15. The pump will deliver the gases or liquids to this location. From that area, the gas or liquid will be forced into the individual channel of the inner cylinder 15 under specific pressure. A pressure gauge 19 will be attached to the inner part of the distributor. This pressure gauge 19 will report to the computer software (not shown) the level of pressure achieved.

Pressure level may be changed by a command executed through computer software to the pump for different position of the rings 14a of the inner cylinder 14. This will enable the pump to deliver specific levels of pressure for each individual are of delivery (sometimes a group of such delivery area). This way different target areas may be supplied with different amounts of gas or liquid under different pressure when the inner cylinder 15 moves to the specific position.

Another choice of construction of the divider (FIGS. 8-12a) is when the inner cylinder 50 has a serpentine groove/ridge 52 which fits into the serpentine indentation 46 on the outer distribution cylinder 49. In the middle of the serpentine groove area is a position for delivery of air or liquid to the sequential position, recessed openings 45, of the outside distributing cylinder 49. proximally and distally from the area with grooves, there is a smooth area of approximately the same length as is the grooves area. At the beginning and the end of these smooth areas are positioned "O" rings 43 for protection of the inter-cylindrical space from outside contamination.

FIG. 4 is an outer view showing the overall appearance of a multi-ring inner cylinder model. FIG. 4a is an end view of the end cap 31. FIG. 4b is a view of the opposite end cap 34.

FIG. 5 is a cross sectional view of a multi-ring inner cylinder model with the actuator 27 in a first ring 45 position.

FIG. 6 is a cross sectional view of a multi-ring inner cylinder model with the actuator 27 in a second ring 47, extended position.

FIGS. 7-7c show various views of the outer distributing cylinder 47 model, having a plurality of rings of recessed openings 45 and a slot 46, formed therein.

FIG. 8 is an illustration of a single inner cylinder 48 model showing the assembly with axle 51.

Figure 9:
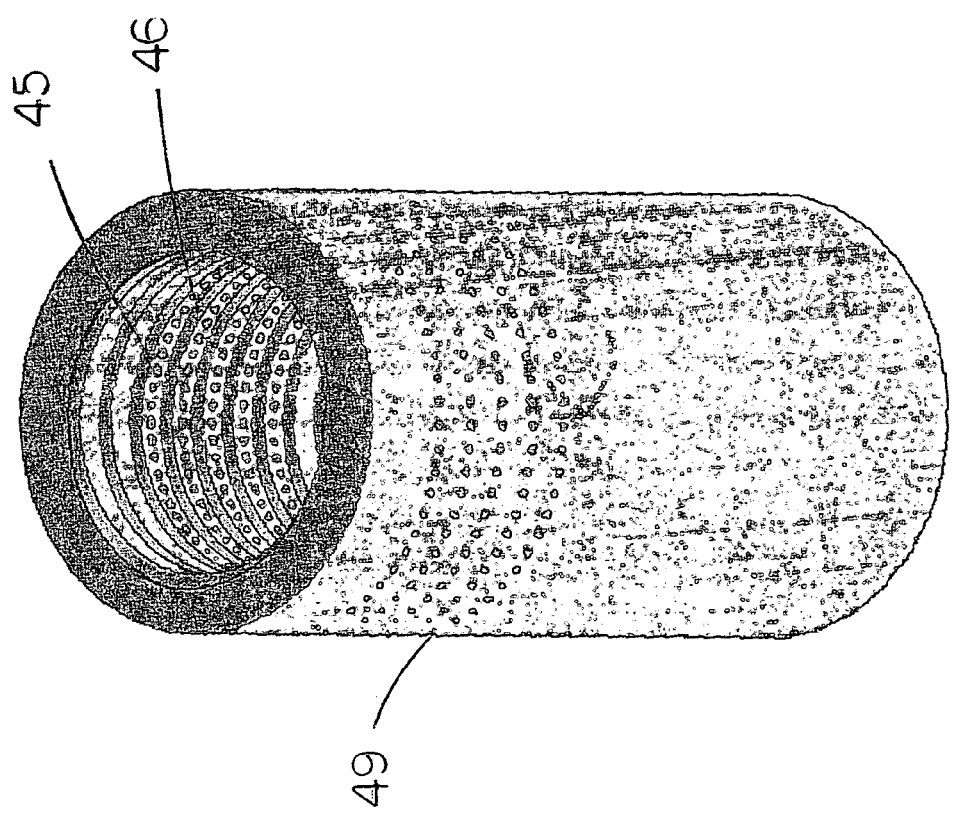
FIG. 9 is an illustration of an outer distributing cylinder model with groove/ridge and indentations in accordance with the invention.

FIG. 9 is a perspective view of an outer distributing cylinder 49 showing the plurality of recessed openings 45 and female screw rings 53.

Figure 10:
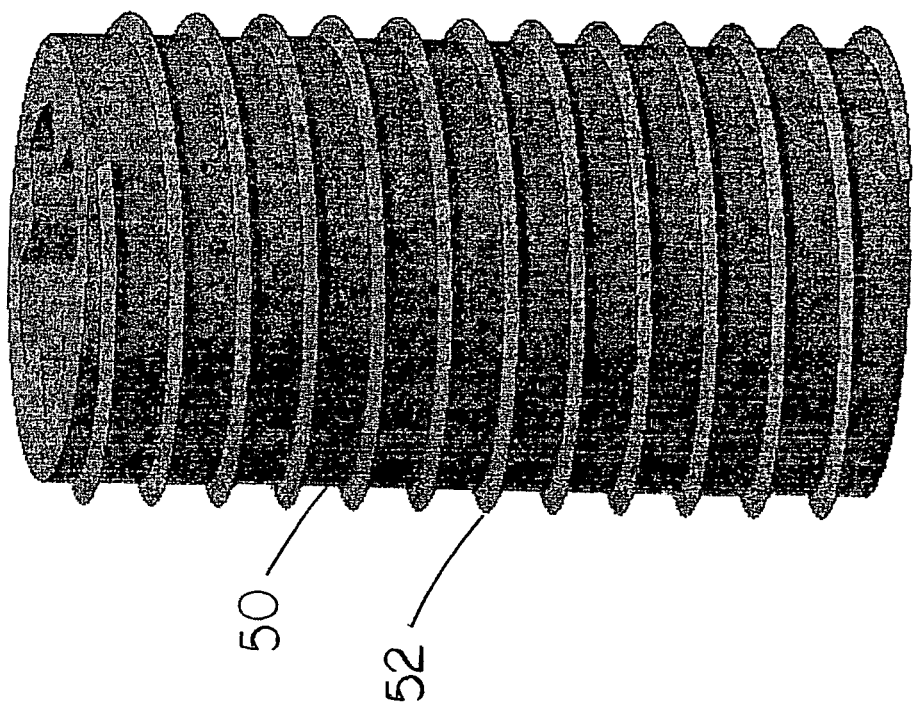
FIG. 10 is an illustration of a single inner cylinder model with groove/ridge and indentations in accordance with the invention.
Figure 11:
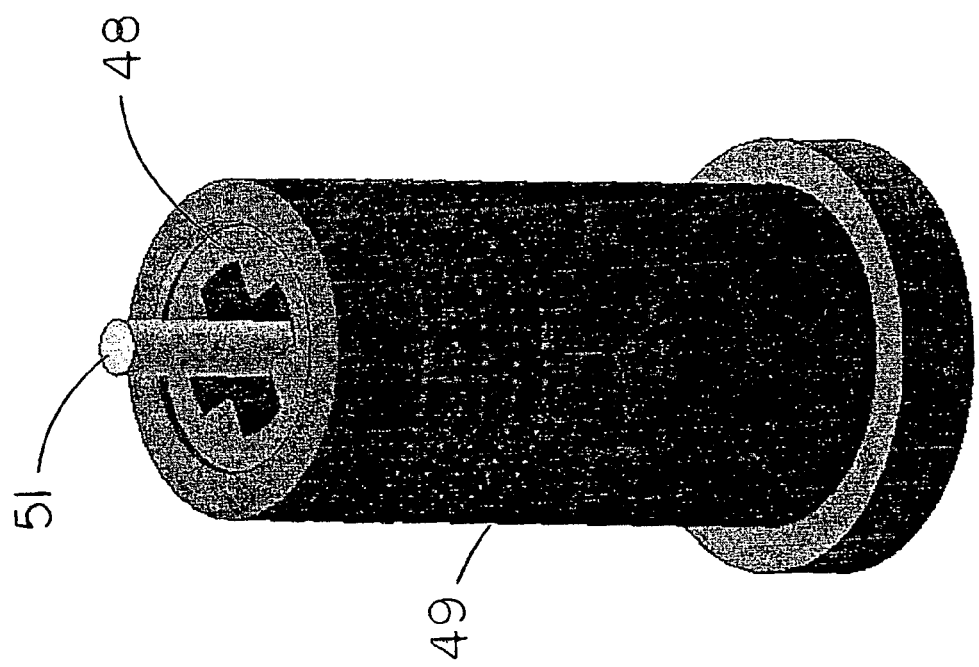
FIG. 11 is an illustration of a single inner cylinder model with groove/ridge and indentations showing the divider with the axle for moving the inner cylinder in the outer distributing cylinder.

FIG. 10 is a perspective view of a single inner cylinder 50 model with a male screw ring 52 formed on the exterior.

Figure 12:
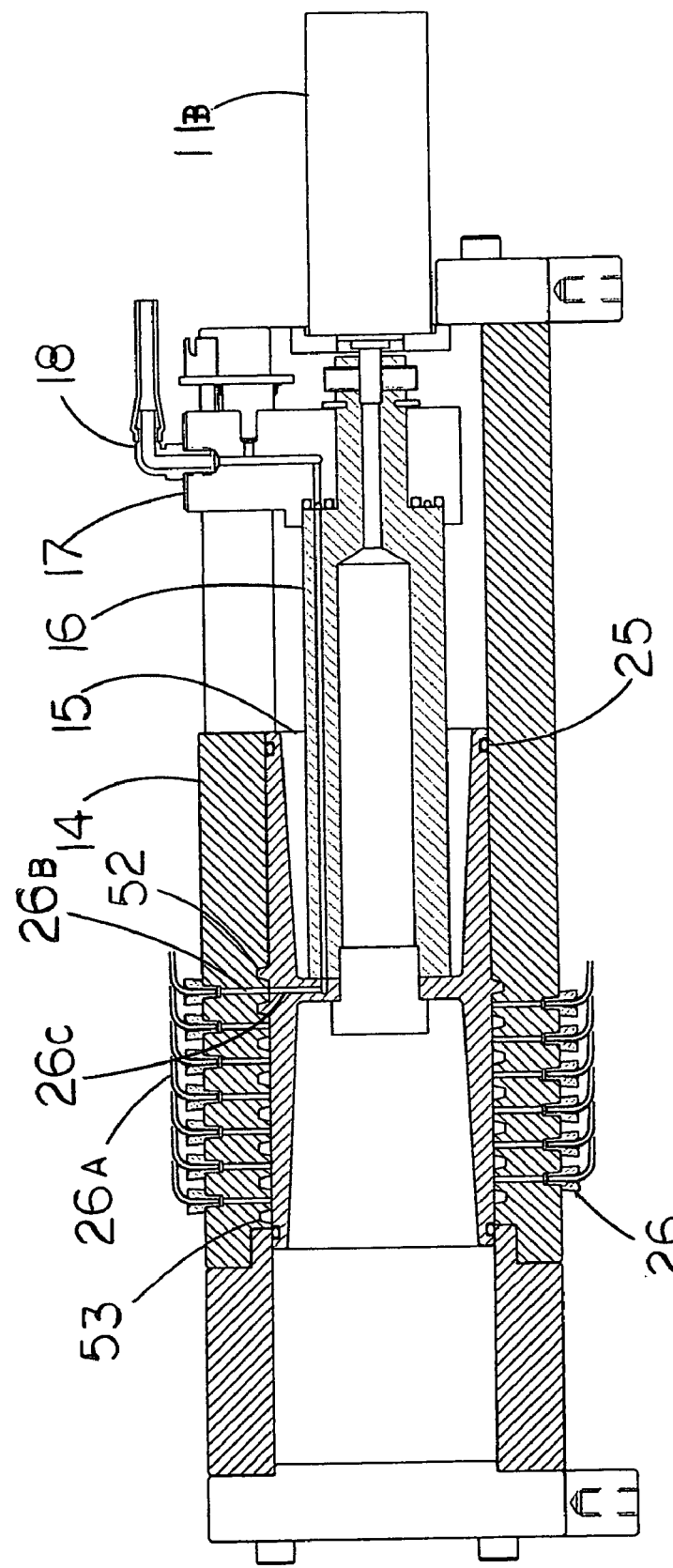
FIGS. 12 and 12a show the two positions of the inner groove type of the cylinder.
Figure 12A:
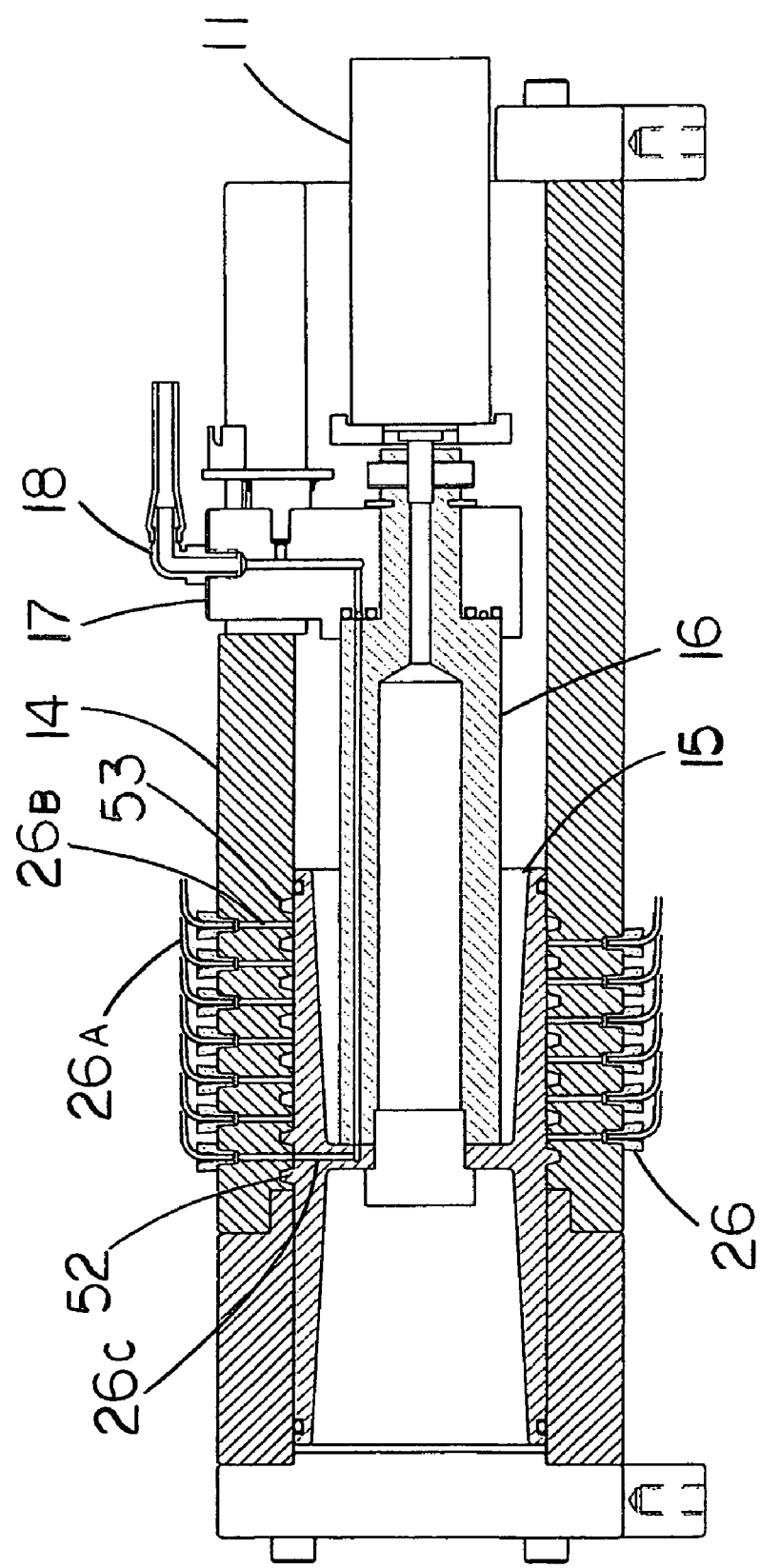

FIGS. 12 and 12a show the two positions of the inner groove model of the cylinder 14 showing the female screw ring 53 and the male screw ring 52. "O" rings 25 are mounted on opposite ends of rotating piston 15. This construction also uses a two stepper motor 11b. One rotates the rings 52 and the other part advances the position of the cylinder 14 to a new ring 52. This construction gives less possibility that the "leaks" affect more than a minimal number of the discharging areas.

The third and fourth choices require a one-stepper motor 11a which only rotates the inner cylinder 15. The grooves of the "screw" type of the inner cylinder 15 always position the discharging area of the inner cylinder 15 with the receiving part of the outer cylinder 14. This choice of construction requires a step motor delivering only circular motion and the cylinders and their serpentine grooves and indentations determine accurate positioning of the movements of the cylinders.

It is important that the inter-cylindrical distances are as close as possible to be maintained. Otherwise, the leaks will possibly occur.

This choice of construction requires a step motor 11b delivering only circular motion and the cylinders and their serpentine grooves and indentations determine accurate positioning of the cylinders.

The last embodiment of the dividers for delivery of the air or liquids involves a smooth outer and inner chamber with a fixed "screw" like axle 54 on which the mechanism for turning the inner cylinder 15 is rotating. The inner cylinder 15 has "O" rings 25 to protect the inter-cylindrical space from the outside environment. This type of construction requires a step motor delivering only circular motion where the "screw" like axle 54 determines accurate positioning of the movements of the cylinders.

Figure 13:
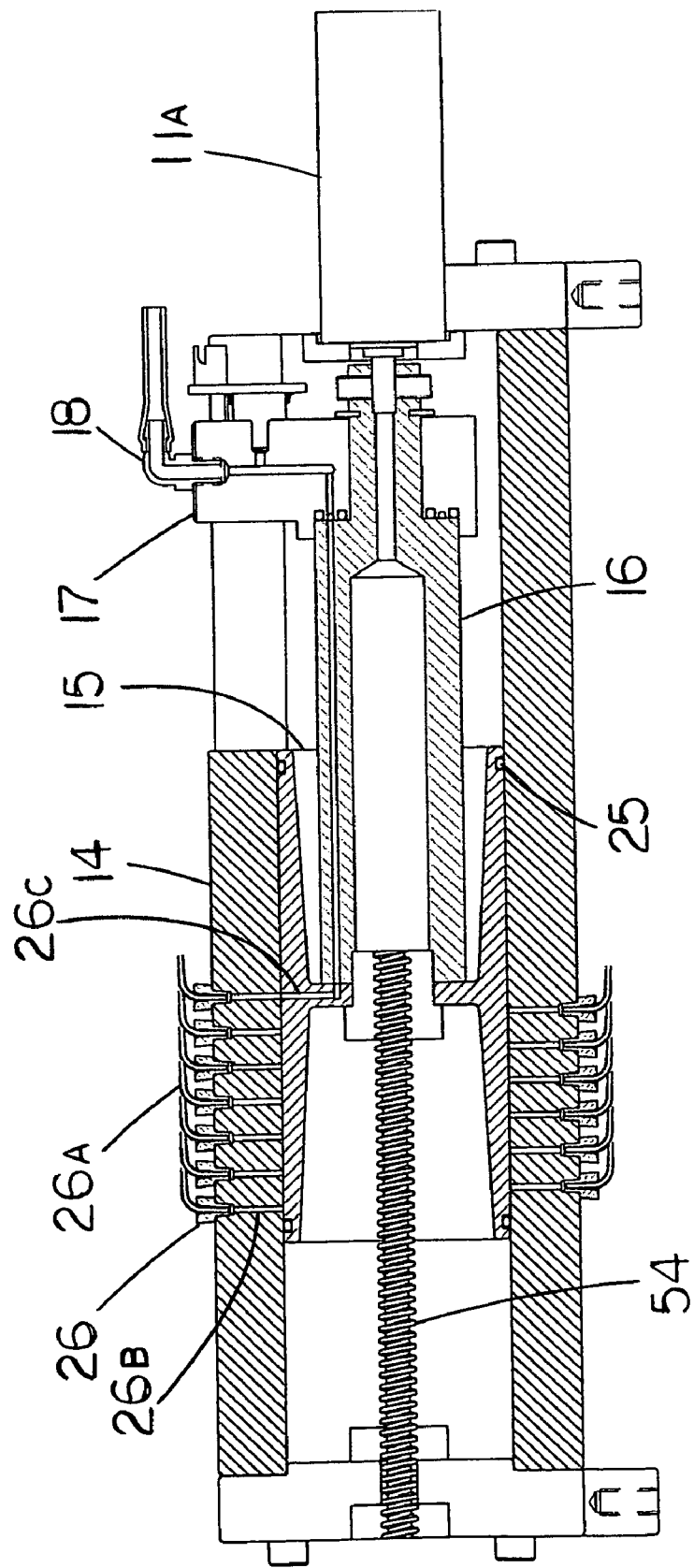
FIGS. 13 and 13a show a screw type of the central part of the cylinder.
Figure 13A:
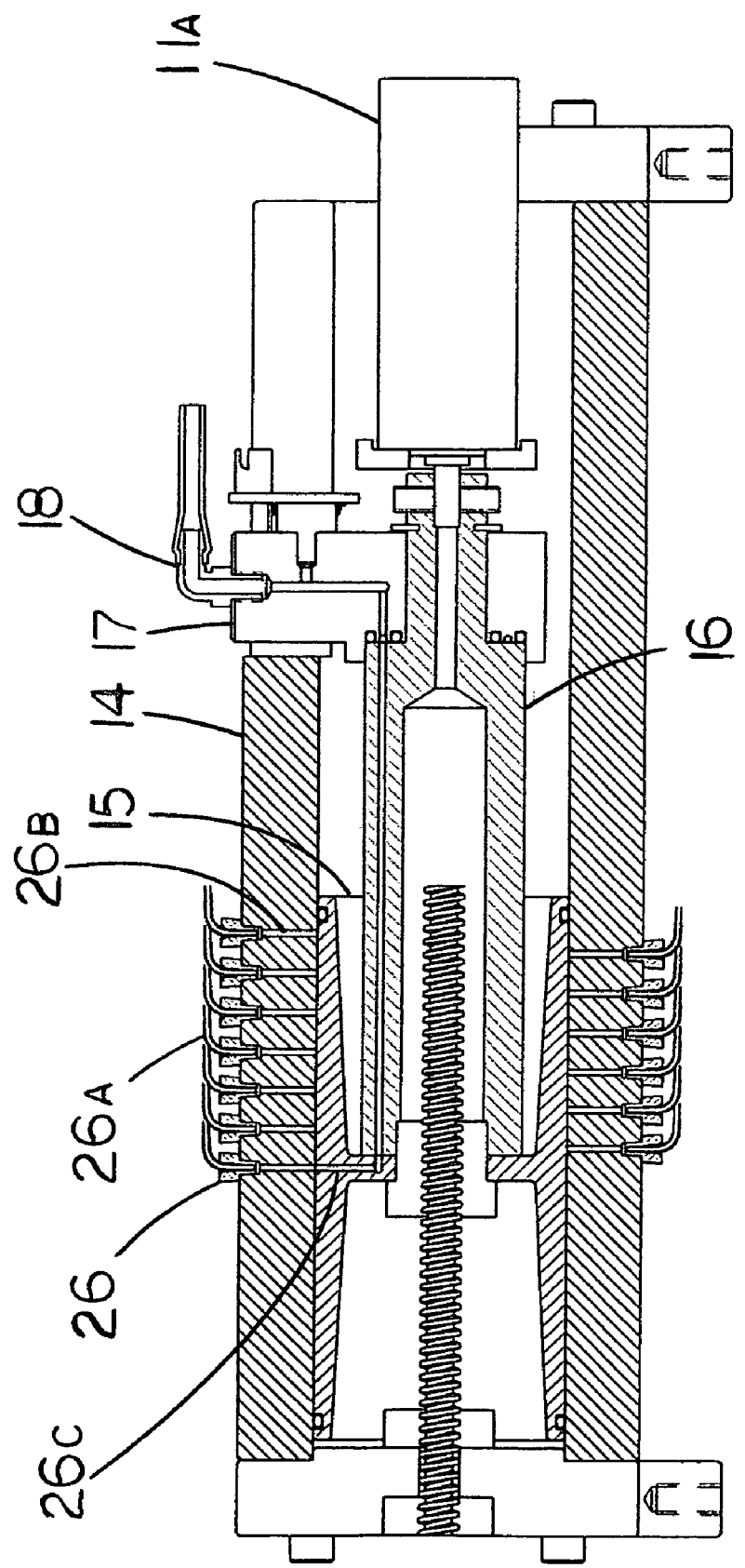

FIGS. 13 and 13a show the two positions of a longitudinal moving inner cylinder piston 15. The piston 15 is of solid construction and has two "O" rings 25 at opposite end. The "O" rings 25 prevent escaping of the air or liquid to the surrounding environment. The release hole 26c connects with the hole 26b on the outer cylinder 14 and when the connection is achieved, the substrate is being released. The two stepper motor 11a directs the inner cylinder 15 to the appropriate position and the substrate is being released. As is the case for all further descriptions, the inner-cylindrical space has to be as tight as possible to prevent the releases to the other points of possible connection.

The advancers for the solid inner cylinders 15 (first embodiment) or for the individual rings 14a (second embodiment) of the inner cylinder 14 are shown. In the case of the solid inner cylinders 15, a two-stepper motor 11 will be used to actuate the rotation and advances of the inner cylinder 15 in the outer distributing cylinder 14. In the third and fourth embodiments, the motor 11a, will perform only circular motion and the construction of the inner cylinder 15 and the outer cylinder 14 will determine the position of the inner cylinder 15 in regards to the outer cylinder 14.

The computer (not shown) will determine the advancement of the solid inner cylinder 15 or its rings 14a of the inner cylinder to specific positions for each of the channels of the outside ring and through this to the channels leading to the specific points of delivery of gases or liquids.

The advancer of the distributor will be powered by an electric motor for moving the solid cylinder or rings of the inner distributing cylinder of the distributor. This will be a commercially available electric motor attached to the distributor.

A pressure sensor 36 will be attached at the pump (not shown) or inner cylinder of the distributor and will be connected with the computer and will deliver the information about achieved pressure during each individual position. The computer will be set in such a manner that the operator will be able to set the computer to deliver through the pump, the appropriate pressure of the gases or liquids. When this pressure is reached, the computer controlling the pump will allow no more inflation by the gases or the flow of the appropriate liquids. However, when there is no need to inflate any area present on the SDGL, the software will direct the distributor to start pumping the next area where the pumping is required.

Pressure level may be changed by the operators through a command executed by the computer software to the pump for different position of the rings 14a of the inner cylinder 15. This will enable the pump to deliver specific level of pressure for each individual area of delivery (sometimes a group of such delivery areas). This way, different area for delivery may be supplied with the gas or liquid under different pressure when the inner cylinder ring 14a moves to this specific position.

Commercially available electric pumps of different kind of either sizes and purposes will be used and appropriately fitted to the distributor and attached to it. Depending on the size of the distributor and its function, the pumps may use the commercially available electricity for their operation or any other appropriate source of power. The pump will be connected with the distributor and will have direct communication with the hollow area of the inner distributing cylinder 15 from where the gases or liquids will be possible to reach all channels.

Computer software will regulate the desired pressure to be applied, frequency and speed of movements of the inner distributing cylinder 15 and other necessary steps of operation. The software will be set in such a manner that the user will be able to set the computer software with directions to give specific orders to the pump to deliver very specific pressure level and, therefore the amount of gas or liquid to be delivered to any appropriate area. When this pressure is reached, the pressure will be maintained by the computer controlling the pump and, after specific time of such delivery to the specific area, the distributor will advance to the next area to be served. Also, when a specific amount of gas or liquid is needed to be delivered, certain other constants will have to be also calculated (temperature, viscosity, resistance of the channels, etc.)

When this is achieved, the divider will advance inner distributor cylinder 15 to the next channel or group of channels, etc. When the last channel is adequately supplied with either gas or liquid, the software of the computer will be set to either stop the operation until further order by the user is received, or to repeat the operation automatically. It will be designed so that the user is notified regarding the specific point of the on-going operation and/or completeness of the ordered operation.

In case when an area is to be supplied with a gas or liquid does not increase in resistance after a certain amount of air or liquid is pumped in it, or does not reach the desired pressure in a specific time, it will mean that this is a fault in this area. for pressurization. Thus, the pressure cannot be achieved at all. In such case where an area is defective, the pump will not be able to fill this specific area with the gas or liquid appropriately. This will be detected because either there is no flow at all to this area or that there is no adequate resistance when pressurization is attempted for that specific area. In such case, the computer software may, during the following sequential pumping, always bypass this area for pressurization and will record the position as a faulty area for possible servicing in the future.

In case that this particular area is critical for the entire operation, computer will notify the user of such critical fault. In cases when malfunction of a few elements will not be deleterious for the function of the overall operation, computer will allow further operation. However, when either the operation is very sensitive or when specific number of malfunctioned channels will cause undesirable effect, the provider of the services will either have to replace individual faulty area or whole sections of them. Determination of which level of service will have to be done will be possible through auditing the computer and informing the user of the functionality of the distributor of gases and liquids.

Although the invention has been described by way of example and with reference to possible embodiments, it is to be appreciated that improvements and/or modifications may be made to these embodiments without departing from the scope of the invention.

What is claimed is:

1. A sequential distributor of gases and liquids for sequential, discrete, distributions of gases/liquids in specific time intervals to the most distal parts of an extremity to the most proximal part of an extremity, said distributor comprising:

an outer distributing cylinder having a plurality of rows of openings formed through said cylinder, an inner distributing cylinder slidably mounted within said outer distributing cylinder, said inner cylinder being driven by an axle, said axle having a first end and a second end, said axle having a hole formed therein through the center of said axle and a hole formed vertically to said hole formed in said center for delivering gases/liquids to said rows of openings in said outer cylinder, said cylinder having an "O" ring mounted on each end for sealing said inner distributing cylinder within said outer distributing chamber, a motor attached at said first end of said axle for driving said inner cylinder, a transfer block attached to said second end of said axle, said transfer block having a pressure sensor mounted thereon, and an elbow mounted thereon for inputting gases/liquids to said transfer block, and a plurality of output hoses connected to said plurality of rows of openings for distribution of minute/large amounts of gases/liquids.

2. A sequential distributor of gases and liquids of claim 1 wherein said inner distributing cylinder comprises a set of rings.

3. A sequential distributor of gases and liquids of claim 1 wherein said outer distributing cylinder, having an interior surface having a serpentine indentation surface formed in said interior surface and said inner distributing cylinder having an exterior surface having a serpentine groove/ridge formed on said exterior surface.

\* \* \* \* \*